(12) United States Patent
Cooper et al.

(10) Patent No.: US 10,100,487 B2
(45) Date of Patent: Oct. 16, 2018

(54) HYDRAULIC ASSEMBLY AND LOGGING EQUIPMENT USING SAME

(71) Applicant: TIGERCAT INDUSTRIES INC., Brantford (CA)

(72) Inventors: Jonathan Craig Cooper, Brantford (CA); Jeffrey Paul Lotz, Brantford (CA)

(73) Assignee: Tigercat Industries Inc., Brantford, Ontario (CA)

( * ) Notice: Subject to any disclaimer, the term of this patent is extended or adjusted under 35 U.S.C. 154(b) by 562 days.

(21) Appl. No.: 13/938,728

(22) Filed: Jul. 10, 2013

(65) Prior Publication Data

US 2015/0016934 A1 Jan. 15, 2015

(51) Int. Cl.
| | | |
|---|---|---|
| *E02F 3/36* | (2006.01) | |
| *B66C 1/68* | (2006.01) | |
| *B66C 1/58* | (2006.01) | |
| *B66C 3/00* | (2006.01) | |

(52) U.S. Cl.
CPC .......... *E02F 3/3677* (2013.01); *E02F 3/3681* (2013.01); *B66C 1/585* (2013.01); *B66C 1/68* (2013.01); *B66C 3/005* (2013.01)

(58) Field of Classification Search
CPC ...... B25J 17/0266; B66C 23/44; B66C 23/54; B66C 23/56; B66C 1/585; B66C 1/68; B66C 3/005; B66C 13/14; B66F 9/065; B66F 9/205; B66F 9/22; E02F 3/30; E02F 3/302; E02F 3/304; E02F 3/308; E02F 3/32; E02F 3/34; E02F 3/3414; E02F 3/342; E02F 3/345; E02F 3/3483; E02F 3/3486; E02F 3/3622; E02F 3/3654; E02F 3/3663; E02F 3/3672; E02F 3/38; E02F 3/384; E02F 3/401; E02F 3/425; E02F 3/427; E02F 3/651; E02F 3/84; E02F 3/844; E02F 9/121; E02F 9/2264; E02F 9/2267; E02F 9/2271; E02F 9/2275
USPC ....... 414/565, 566, 680, 682, 685, 687, 690, 414/691, 694, 695.5, 705, 722, 723, 735, 414/744.3, 744.4, 744.5
See application file for complete search history.

(56) References Cited

U.S. PATENT DOCUMENTS

| | | | | |
|---|---|---|---|---|
| 4,958,981 A | * | 9/1990 | Uchihashi | E02F 3/3681 294/86.41 |
| 7,066,076 B2 | * | 6/2006 | Roy | A01G 23/003 414/738 |
| 7,311,489 B2 | * | 12/2007 | Ekman | B66C 3/005 294/86.41 |

(Continued)

FOREIGN PATENT DOCUMENTS

| | | | | |
|---|---|---|---|---|
| EP | 1889808 A1 | * | 2/2008 | ............. B66C 3/005 |
| EP | 2789565 A1 | * | 10/2014 | ............. B66C 3/005 |

*Primary Examiner* — Saul Rodriguez
*Assistant Examiner* — Brendan P Tighe
(74) *Attorney, Agent, or Firm* — Gowling WLG (Canada) LLP; Neil W. Henderson

(57) ABSTRACT

A hydraulic assembly including a pivot connection defining a pivot axis, a hydraulic element linked to the pivot connection, and a connector for connecting a hydraulic conduit to the hydraulic element. The connector defines a connection axis and the connector is configured such that the connection axis approximately intersects the pivot axis. The hydraulic assembly may be used in various applications, including in forestry equipment, for example, with a rotator link assembly.

19 Claims, 17 Drawing Sheets

(56) References Cited

U.S. PATENT DOCUMENTS

| | | | |
|---|---|---|---|
| 9,708,165 B2* | 7/2017 | Oberg | B66C 13/16 |
| 2005/0017528 A1* | 1/2005 | Ekman | B66C 3/005 |
| | | | 294/86.41 |
| 2013/0056588 A1* | 3/2013 | Harr | B66C 13/14 |
| | | | 248/49 |
| 2016/0061230 A1* | 3/2016 | Jacobson | E02F 3/3681 |
| | | | 60/487 |

* cited by examiner

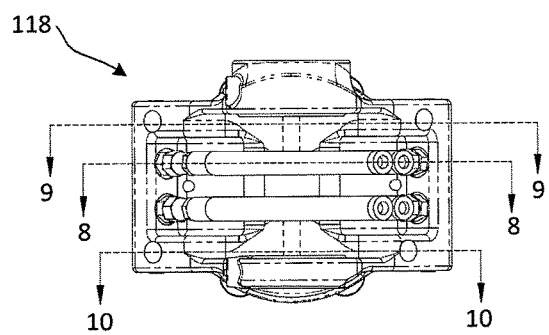
Figure 4C
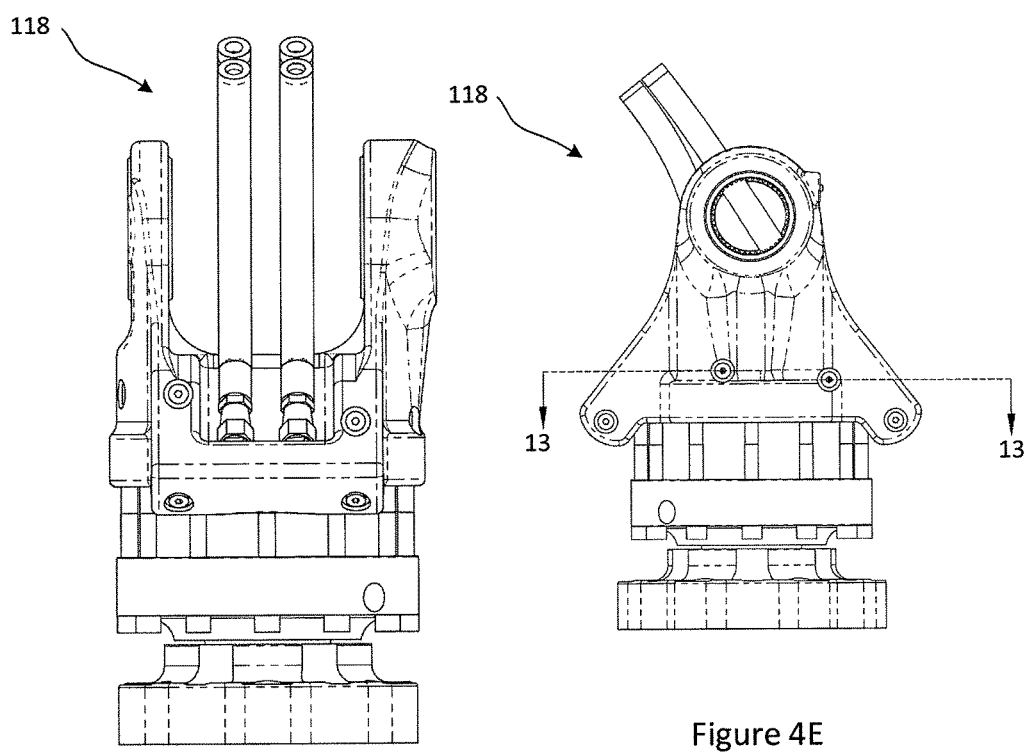
Figure 4D
Figure 4E

HYDRAULIC ASSEMBLY AND LOGGING EQUIPMENT USING SAME

FIELD

The present disclosure relates generally to a hydraulic assembly. More particularly, the present disclosure relates to a hydraulic assembly for logging equipment and, even more particularly, to a hydraulic assembly for a rotator link assembly in logging equipment.

BACKGROUND

Hydraulic assemblies, including hydraulic conduits, are used for the communication of pressurized fluid to drive hydraulic components. In some cases, the hydraulic components may be part of a mechanical system that includes pivot points for rotational movement of mechanical or hydraulic components.

In a particular case, the hydraulic component may be for driving a rotator and an implement that are suspended at the end of a crane. In this case, hydraulic conduits run from a pressure medium source along a crane through a rotator link assembly and to the implement. The rotator link assembly includes a hydraulic component for driving rotation of the implement as well as a hydraulic component for operating the implement. The rotator link assembly also includes a pivot connection to the crane. In this situation, it may be difficult to provide durable hydraulic conduit connectors as the hydraulic conduits will be under stress as a result of the movement of the crane, pivot connection, rotator, and implement.

Further, when fed along a crane, via a rotator link assembly to an implement, the hydraulic conduits may be exposed to surrounding objects when the crane, pivot connection, or rotator moves and this may cause damage to the hydraulic conduits. Damage to the hydraulic conduits may lead to failure of the conduit and hydraulic fluid leakage. When damaged, the hydraulic conduits must be replaced causing reduced production and increased operational costs.

Examples of conventional hydraulic conduit assemblies are described in United States Patent Application Publication No. 2013/0056588 to Harr et al. and U.S. Pat. No. 7,311,489 to Ekman.

It is, therefore, desirable to provide a hydraulic assembly configured to reduce hydraulic conduit failure.

SUMMARY

It is an object of the present disclosure to obviate or mitigate at least one disadvantage of previous hydraulic assemblies or systems.

In an aspect, the present disclosure provides a hydraulic assembly including a pivot connection defining a pivot axis, a hydraulic element linked to the pivot connection, and a connector for connecting a hydraulic conduit to the hydraulic element. The connector defines a connection axis and the connector is configured such that the connection axis approximately intersects the pivot axis.

In a particular case, the hydraulic element may include a hydraulic drive.

In another particular case, the pivot connection may include a pair of pins attaching the hydraulic element to a link and the hydraulic conduit passes between the pair of pins.

In the case of a hydraulic drive, the hydraulic drive defines a hydraulic drive axis and an angle between the connection axis and the hydraulic drive axis may be greater than approximately 5 degrees and less than approximately 85 degrees.

In a further particular case, the angle may be approximately 30 degrees.

In a further case, the hydraulic drive may include a rotational drive and the hydraulic drive axis is the axis of rotation of the rotational drive.

In another aspect, the present disclosure provides equipment including a link, a rotator pivotally attached to the link at a first pivot connection defining a first pivot axis and a hydraulic assembly. The hydraulic assembly includes a hydraulic element provided to the rotator and a connector provided to the rotator for connecting a hydraulic conduit to the hydraulic element. The connector defines a connection axis and the connector is configured such that the connection axis approximately intersects the first pivot axis.

In a particular case, the hydraulic element may be a rotational drive defining a rotation axis and an angle between the connection axis and the rotation axis may be greater than approximately 5 degrees and less than approximately 85 degrees. In a particular case, the angle may be approximately 30 degrees.

In a particular case, the first pivot axis may be perpendicular to the rotation axis.

In a further particular case, the first pivot connection may include a first pair of pins attaching the rotator to the link and the hydraulic conduit passes between the first pair of pins.

In another particular case, the equipment further may include a crane and the link may be pivotally attached to the crane at a second pivot connection defining a second pivot axis.

In a further particular case, the equipment may further include a crane connector provided to the crane for connecting the hydraulic conduit to the crane. The crane connector defines a crane connection axis and the crane connector is configured such that the crane connection axis approximately intersects the second pivot axis.

In a further particular case, the second pivot axis may be perpendicular to the first pivot axis.

In a further particular case, the second pivot connection may include a second pair of pins attaching the link to the crane and the hydraulic conduit passes between the second pair of pins.

In a further case, the hydraulic element may be an implement provided to the rotator and the hydraulic conduit supplies hydraulic fluid to the implement.

In still a further case, the implement may be a grappler.

In yet a further case, the hydraulic element may include a plurality of hydraulic elements and the hydraulic conduit may include a plurality of hydraulic conduits supplying hydraulic fluid to the plurality of hydraulic elements.

In this case, the plurality of hydraulic elements may include a rotational drive and a grappler.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIGS. 4A, 4B, 4C, 4D, and 4E are front, bottom, top, side, and rear views, respectively, of the rotator of FIGS. 3A and 3B;

DETAILED DESCRIPTION

Generally, the present disclosure provides a hydraulic assembly and, in particular a hydraulic assembly for a rotator link assembly for passing hydraulic fluid from a crane to a hydraulic drive. In this disclosure, the embodiments of the hydraulic assembly are described as an element of a rotator link assembly; however, one of skill in the art will understand that the hydraulic assembly may be applied in other hydraulic systems.

Figure 1:
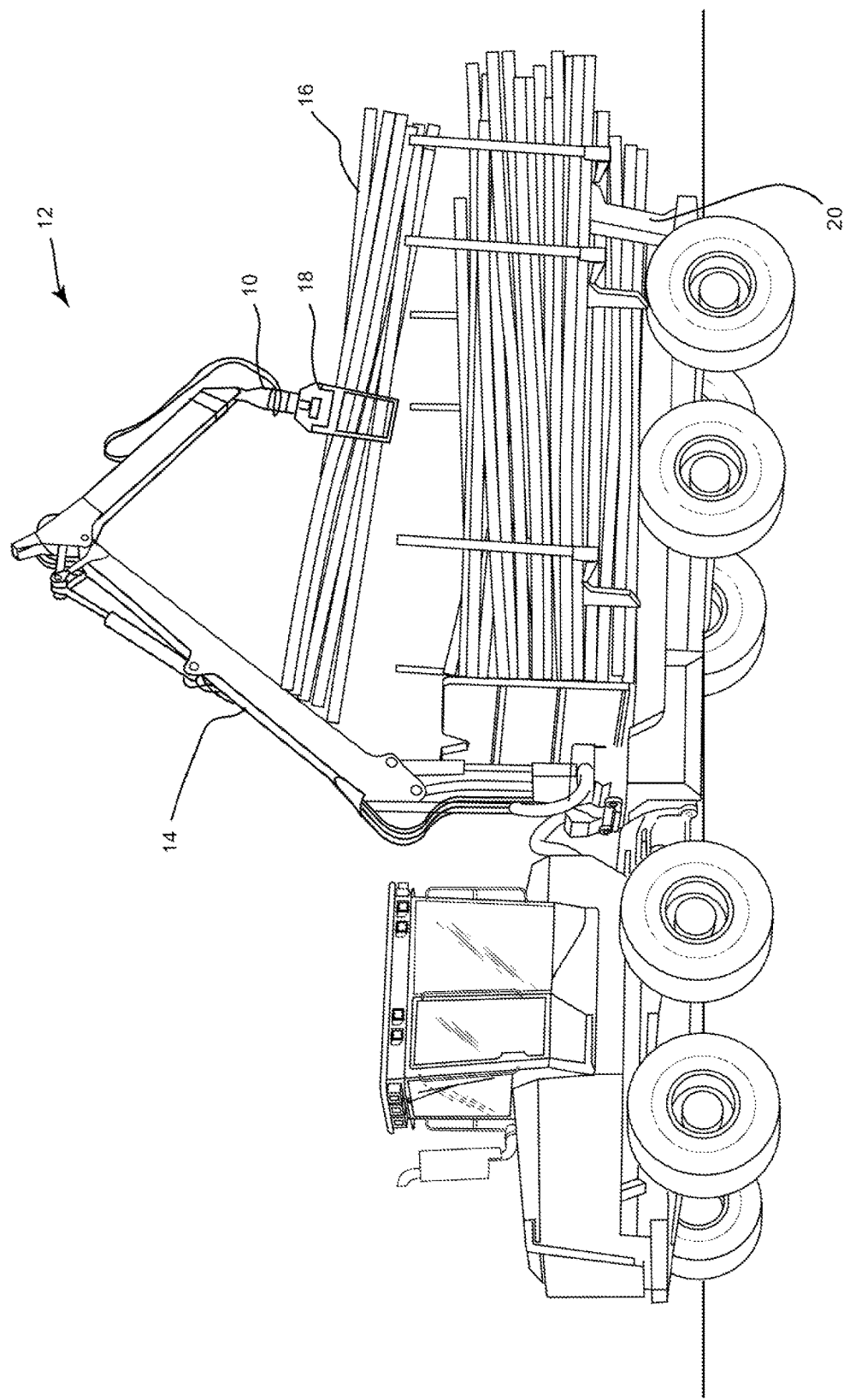
FIG. 1 is a photograph of logging equipment, and, in particular, a forwarder, having a rotator link assembly.

FIG. 1 illustrates an example of logging equipment where a rotator link assembly 10 may be used. In this case, the logging equipment is a forwarder 12. An operator of the forwarder 12 maneuvers a crane 14 above objects (e.g. logs) 16 to be picked up and actuates a grapple implement 18 to close arms of the grapple implement 18 around the logs 16. The crane 14 may have a telescopic boom which extends telescopically along the length of the crane 14. Either before or after the arms of the grapple implement 18 are closed, the operator may use the rotator link assembly 10 to rotate the grapple implement 18 while also manipulating the crane 14. By appropriately operating the rotator link assembly 10 and grapple implement 18, the operator can load the logs 16 into a trailer 20. The rotator link assembly 10 in FIG. 1 is a conventional rotator link assembly but could be replaced by a rotator link assembly as described herein. It will further be understood that the rotator link assembly as described herein may be used in a variety of operations, not limited to the forwarder 12 or other logging applications.

FIGS. 2A to 2G illustrate various views of a crane 112 having a rotator link assembly 100, in accordance with an embodiment. The rotator link assembly 100 attaches on a distal end 113 of the crane 112. The other end of the rotator link assembly 100 connects to an implement 114. In the embodiment shown, the implement 114 is a grappler. The implement 114 may be any type of implement 114 which operates using hydraulics, as is known in the art. The rotator link assembly 100 is particularly useful where rotation about at least one axis and actuation of an implement is desired.

Figure 2A:
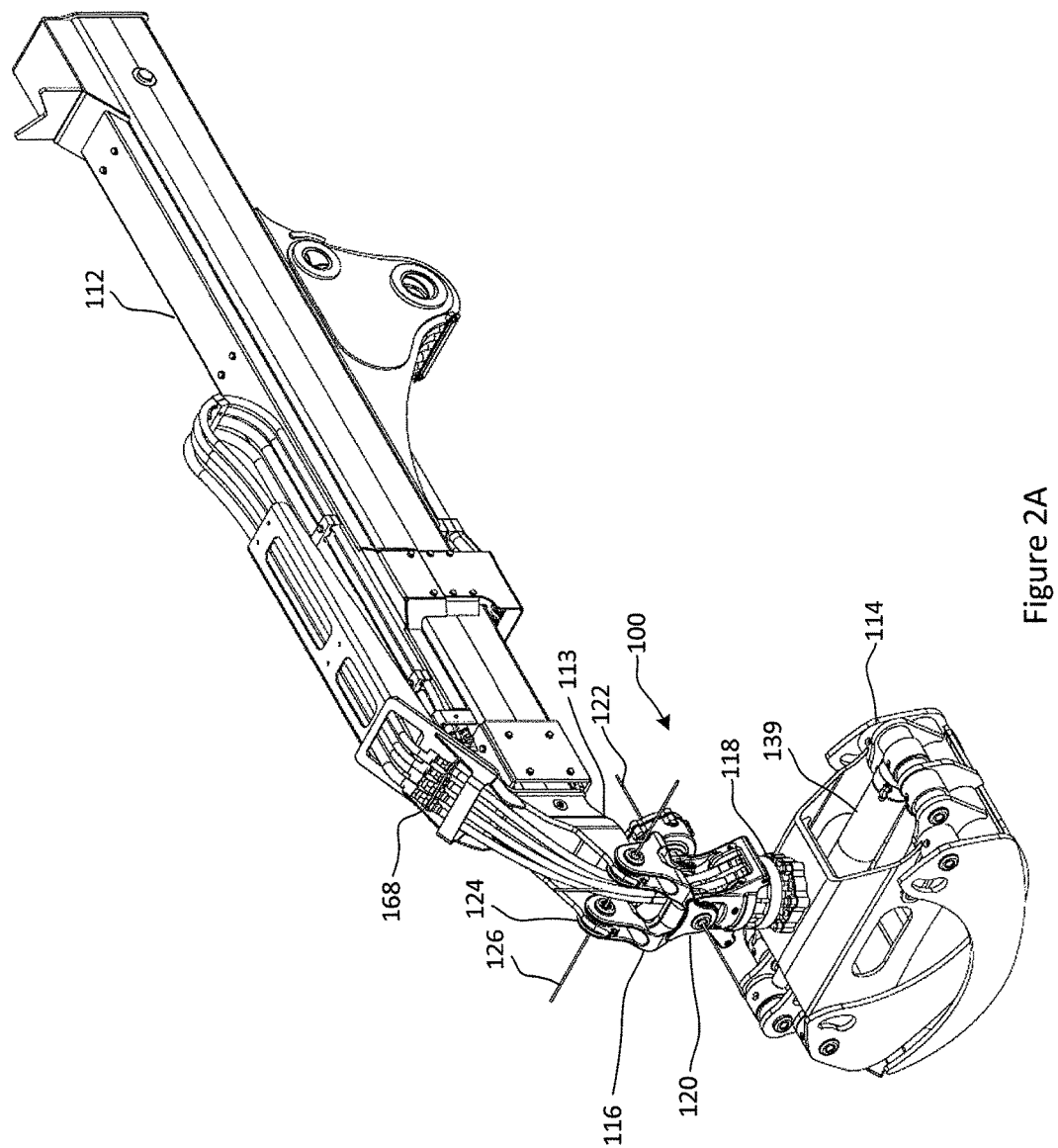
FIGS. 2A, 2B, 2C, 2D, 2E, 2F, and 2G illustrate perspective, detailed, side, end, section (along section 2E-2E of FIG. 2C), top, and bottom views of a crane and a rotator link assembly, in accordance with an embodiment.
Figure 2B:
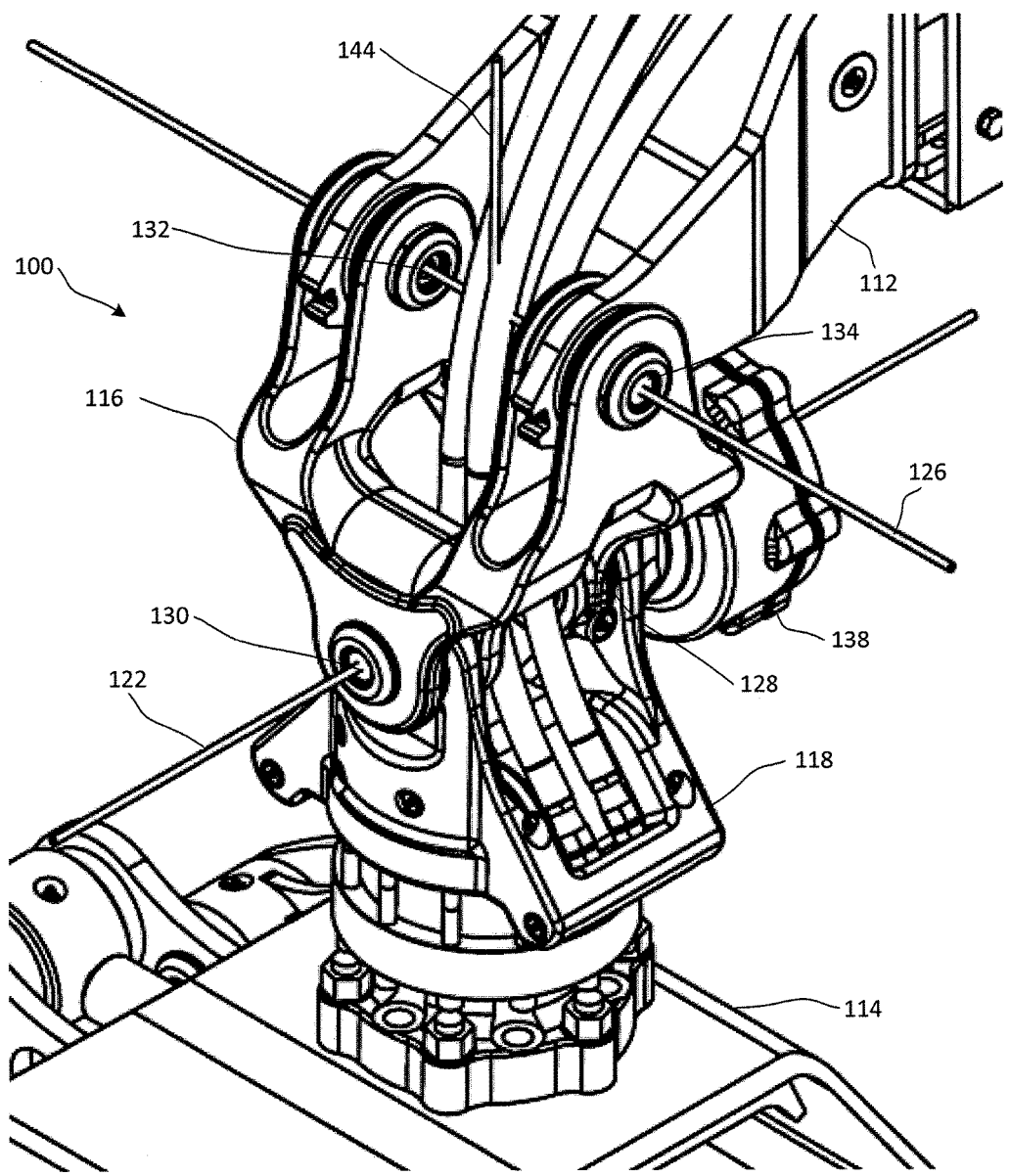
Figure 2C:
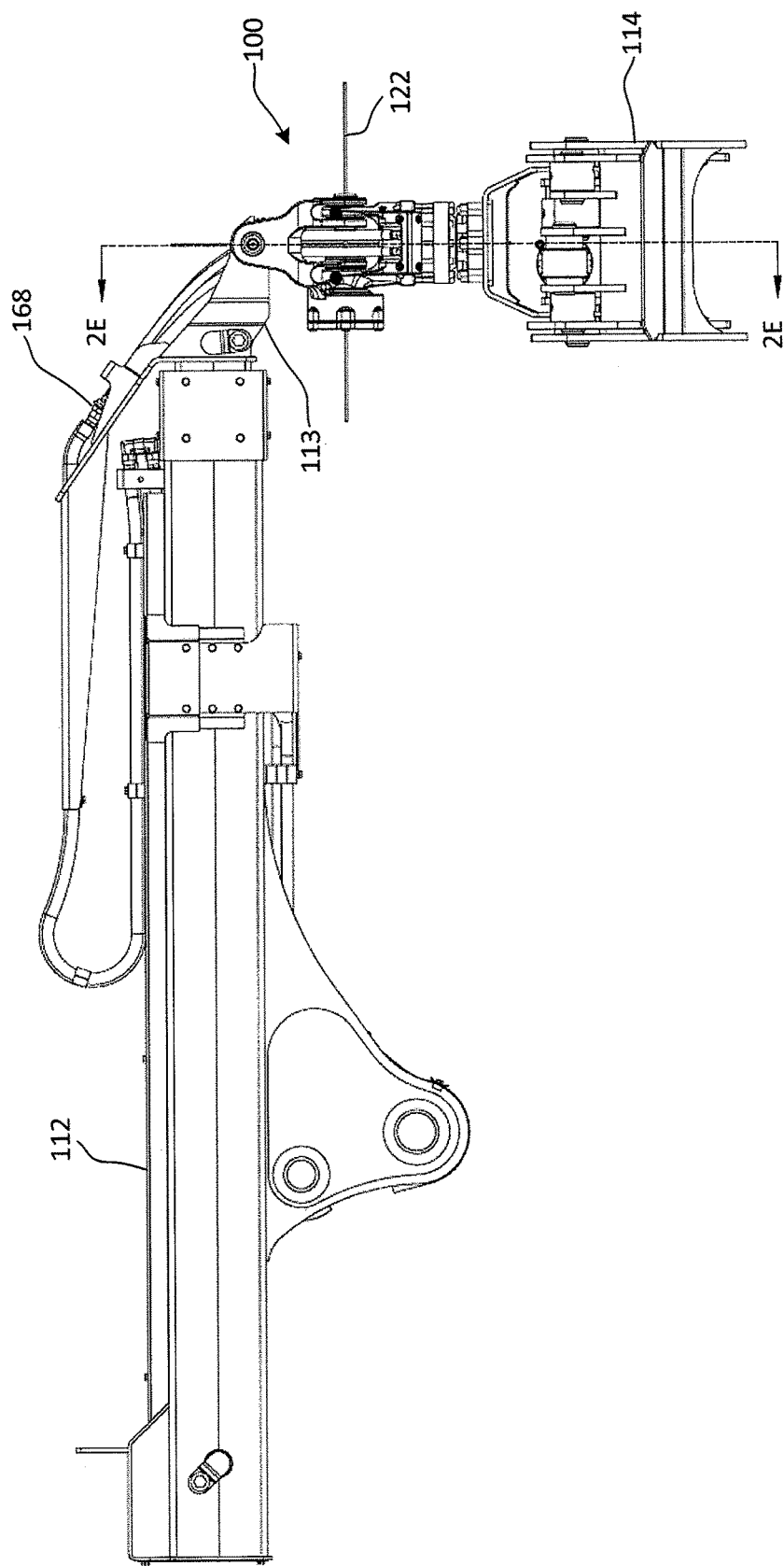
Figure 2D:
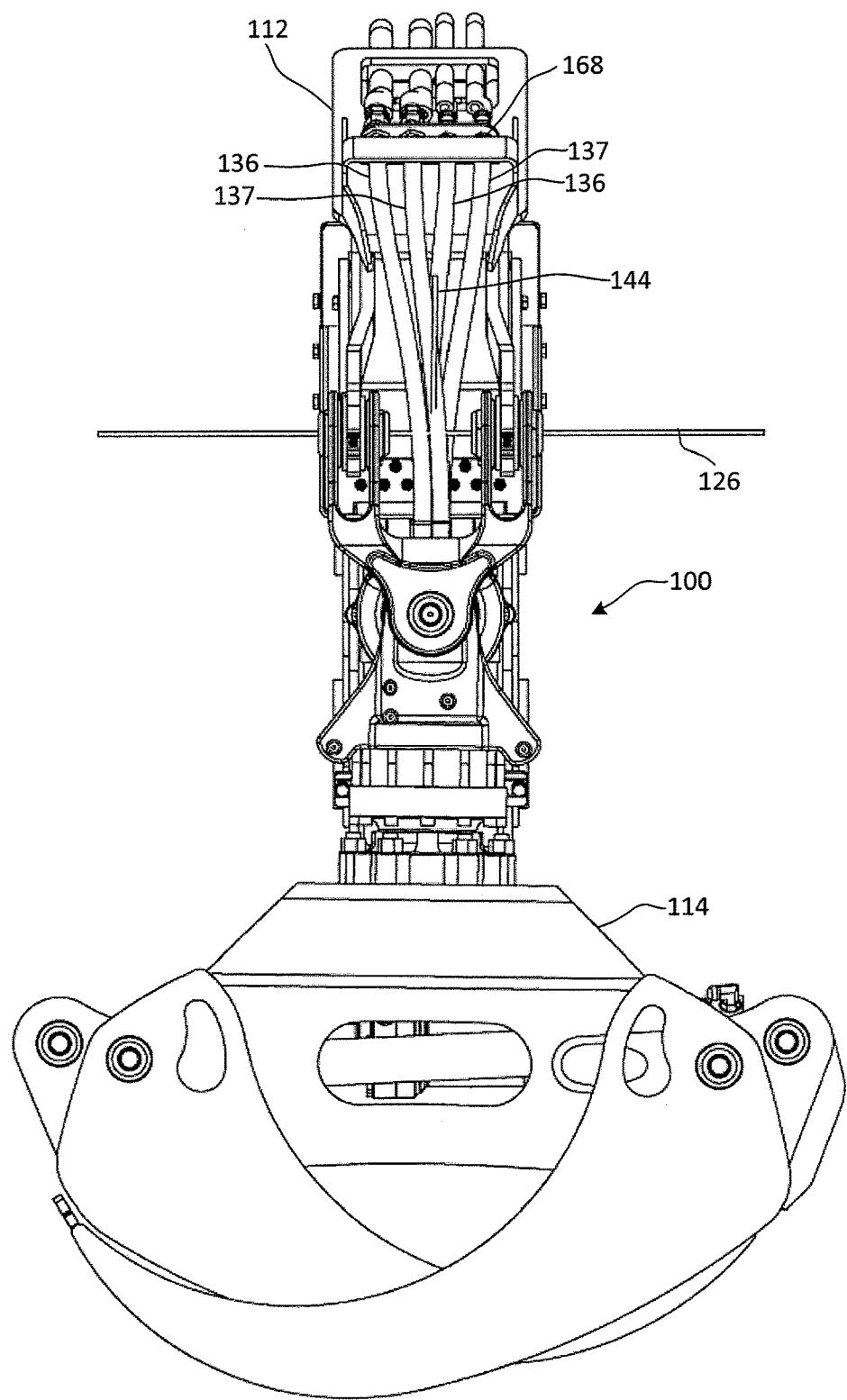
Figure 2E:
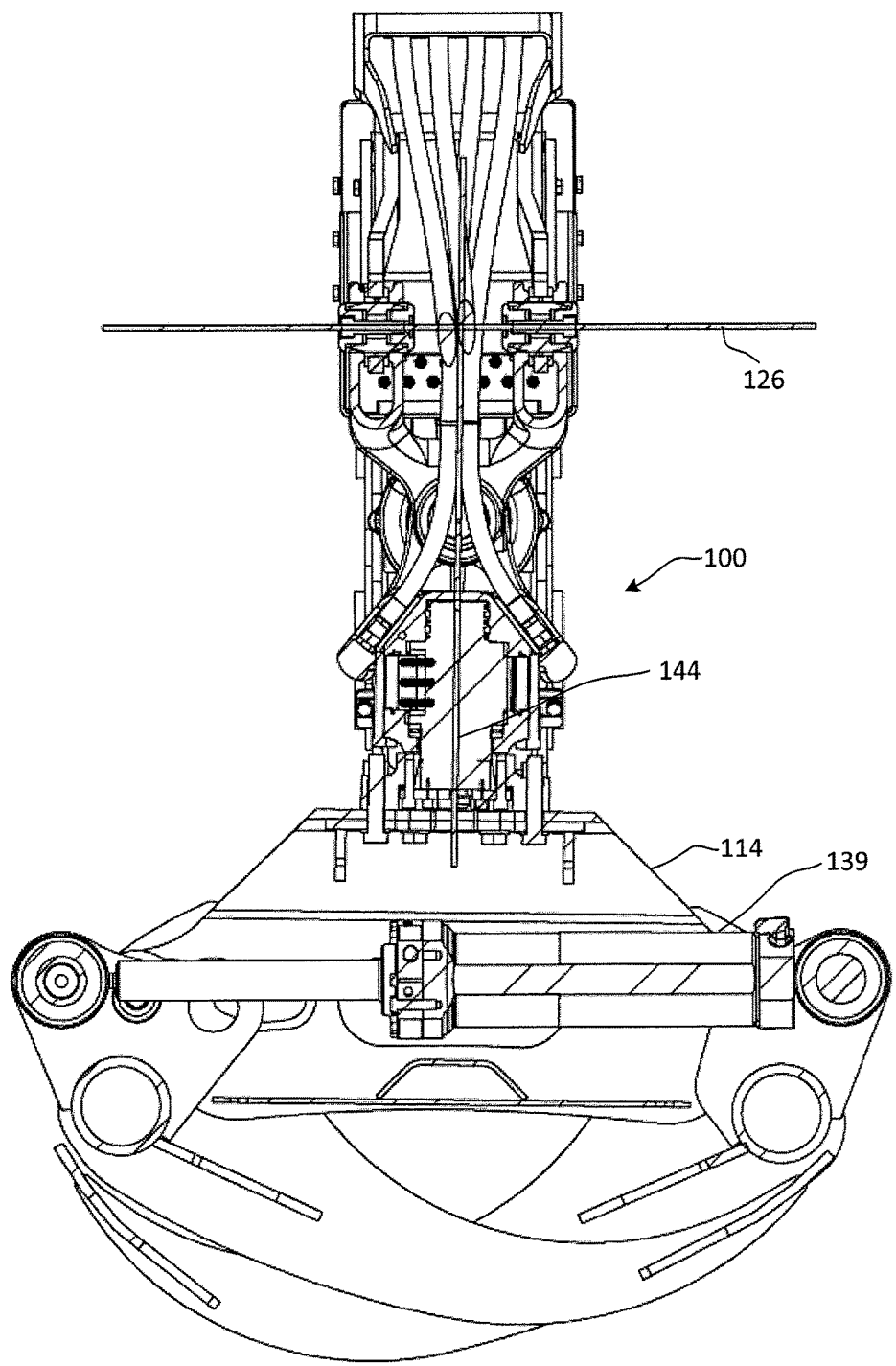

As shown in more detail in FIG. 2B, the rotator link assembly 100 includes a link 116 and a rotator 118. The link 116 connects to the rotator 118 by a first pivot connection 120 having a first axis 122. The first axis 122 may be horizontal in an at rest configuration. The link 116 also connects to the distal end 113 of the crane 112 by a second pivot connection 124 having a second axis 126. The second axis 126 may also be horizontal in an at rest configuration but is oriented perpendicular to the first pivot axis 122. The pivot connections 120, 124 thus allow the rotator 118 to rotate freely about the first and second axes 122, 126. The first pivot connection 120 includes a pair of laterally spaced pins 128, 130 and the second pivot connection 124 includes a pair of laterally spaced pins 132, 134. The pivot pins 128, 130, 132, 134 are spaced to allow hydraulic conduits 136, 137 to pass therebetween. The first pivot connection 120 may include a friction device 138 for dampening motion about the first axis 122 due to the movement of the rotator 118.

Figure 3B:
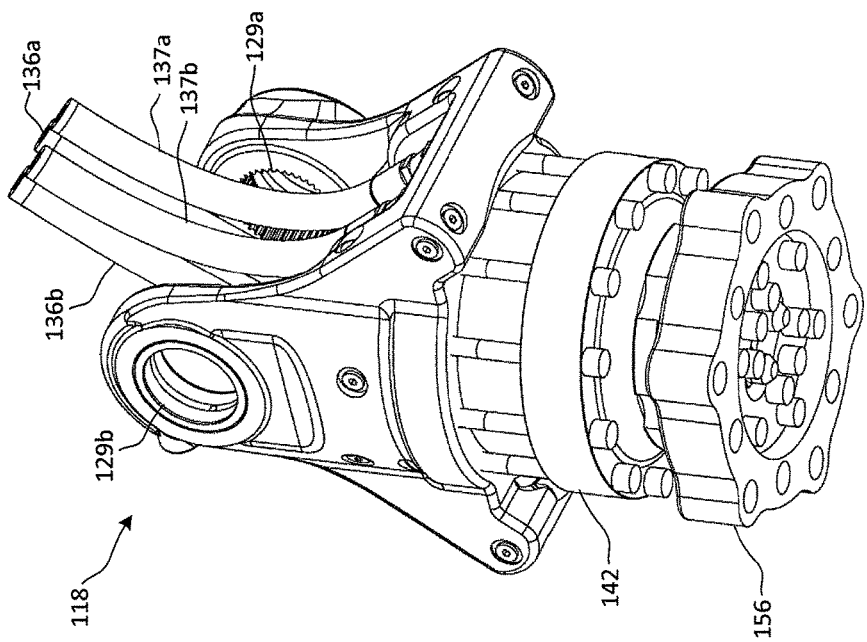
FIGS. 3A and 3B are perspective views of a rotator, in accordance with an embodiment.
Figure 3A:
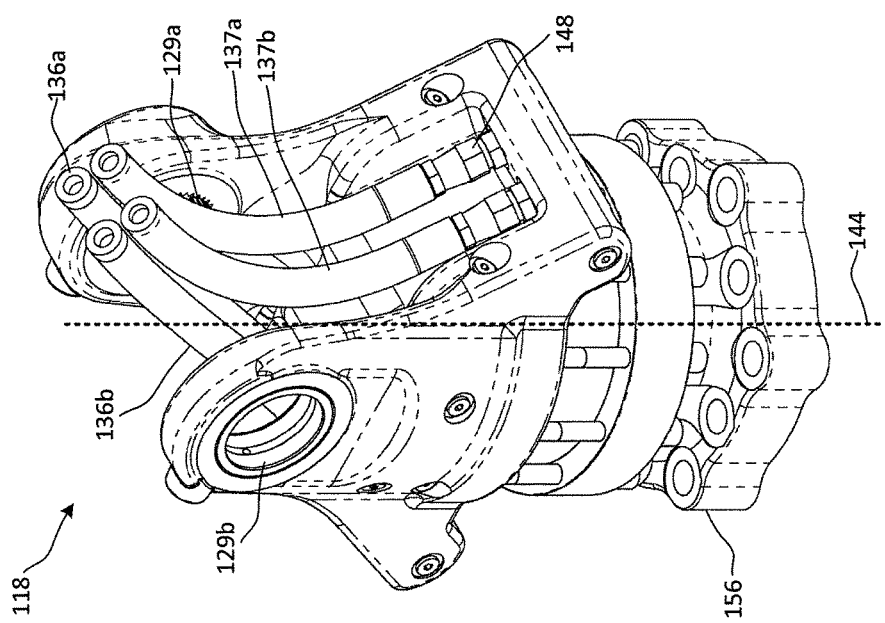
Figure 4B:
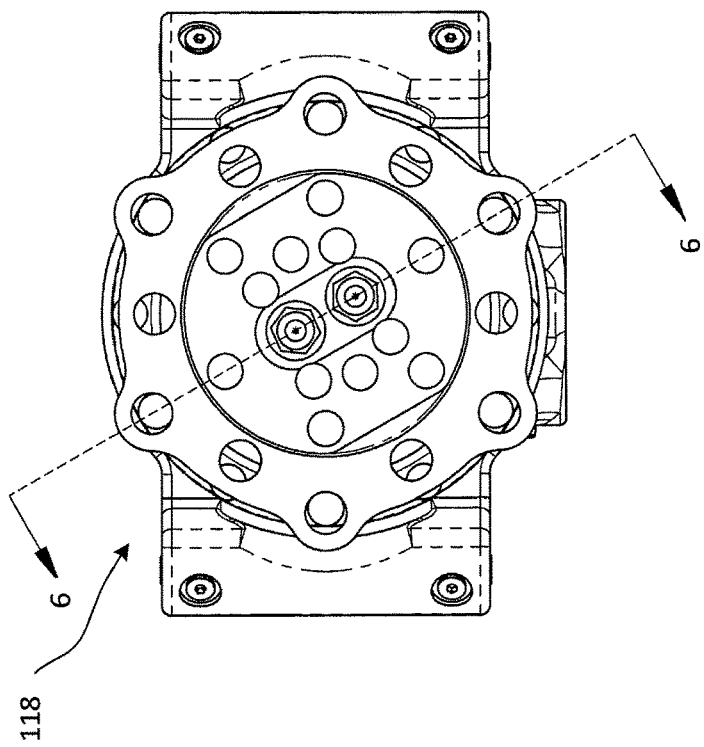
Figure 4A:
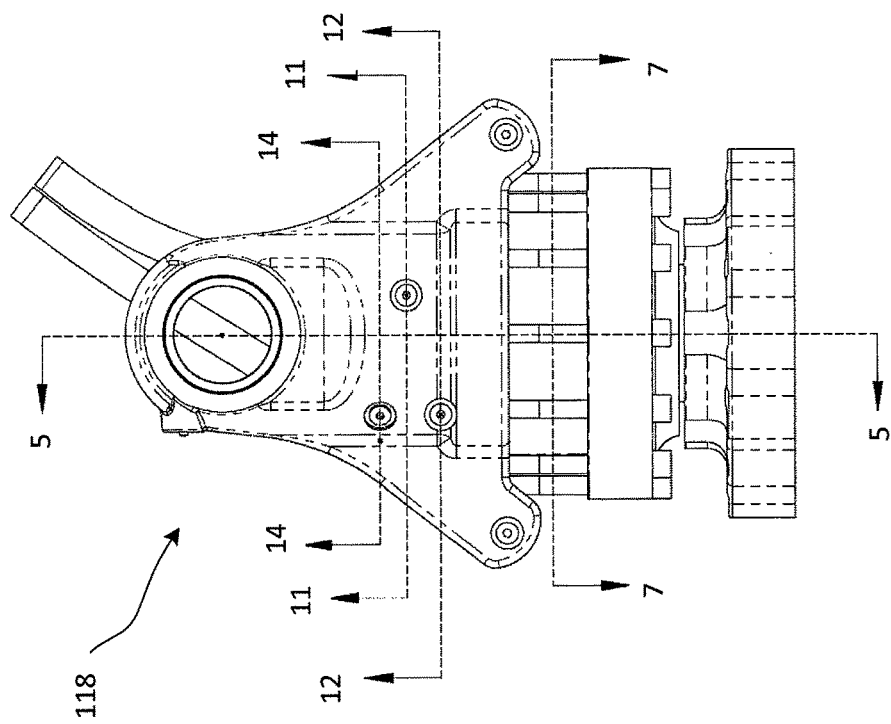
Figure 6:
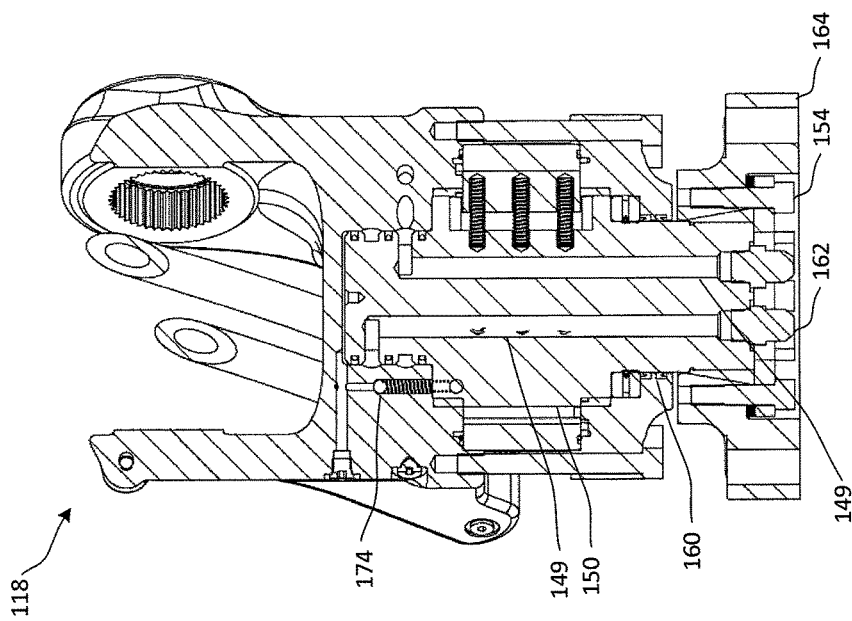
FIG. 6 is a section view of the rotator of FIGS. 3A and 3B along section 6-6 of FIG. 4B.
Figure 5:
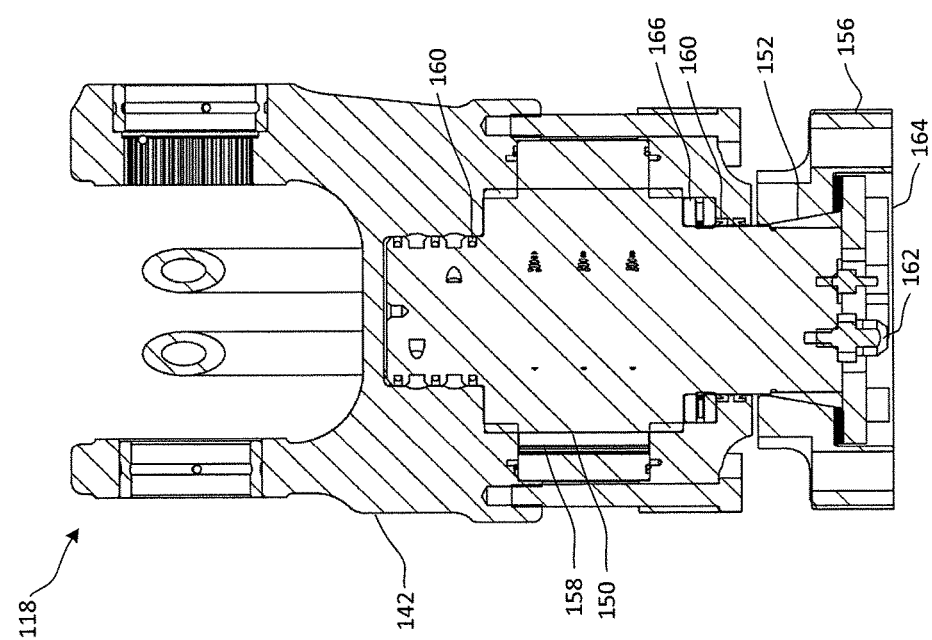
FIG. 5 is a section view of the rotator of FIGS. 3A and 3B along section 5-5 of FIG. 4A.
Figure 7:
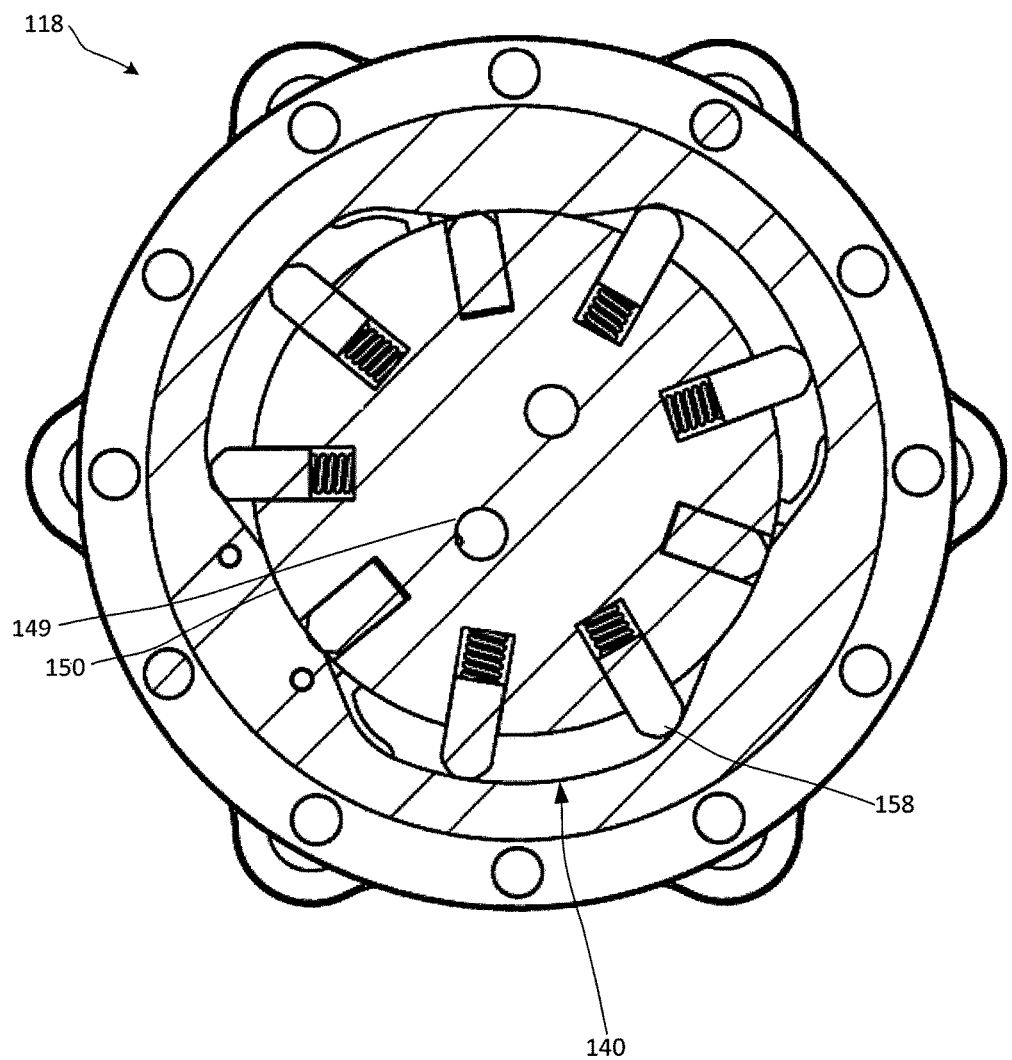
FIG. 7 is a section view of the rotator of FIGS. 3A and 3B along section 7-7 of FIG. 4A.
Figure 8:
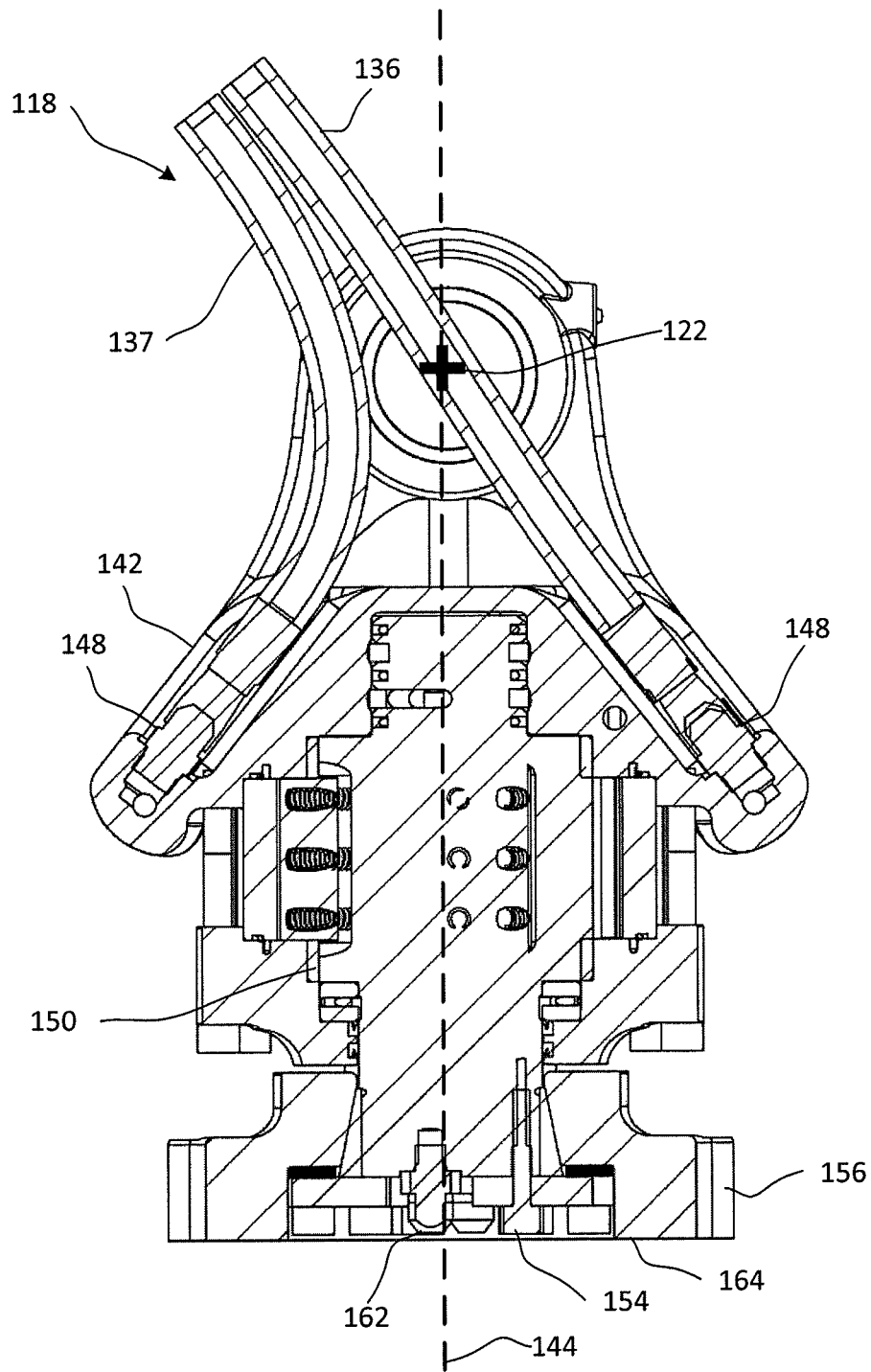
FIG. 8 is a section view of the rotator of FIGS. 3A and 3B along section 8-8 of FIG. 4C.
Figure 10:
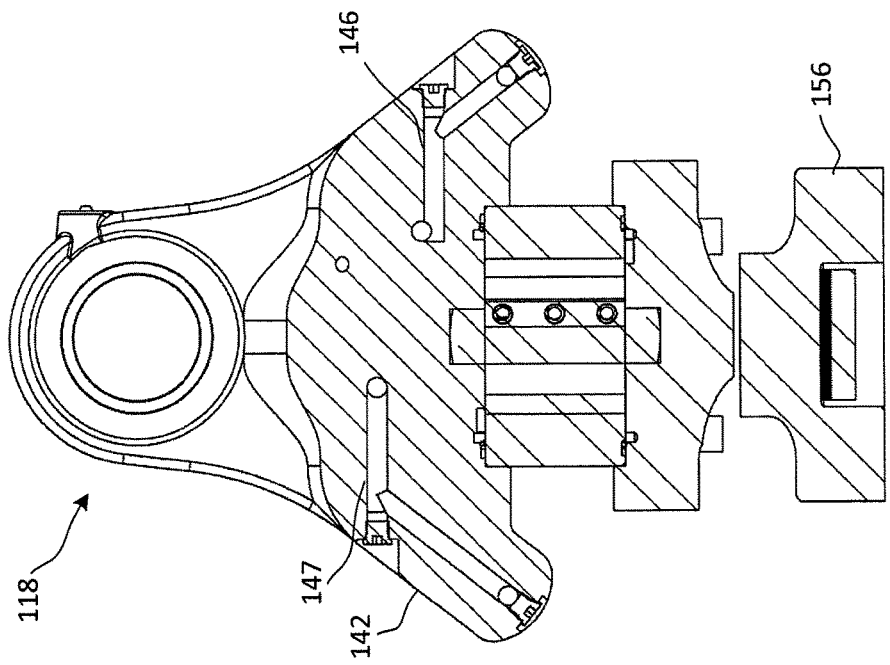
FIG. 10 is a section view of the rotator of FIGS. 3A and 3B along section 10-10 of FIG. 4C.
Figure 9:
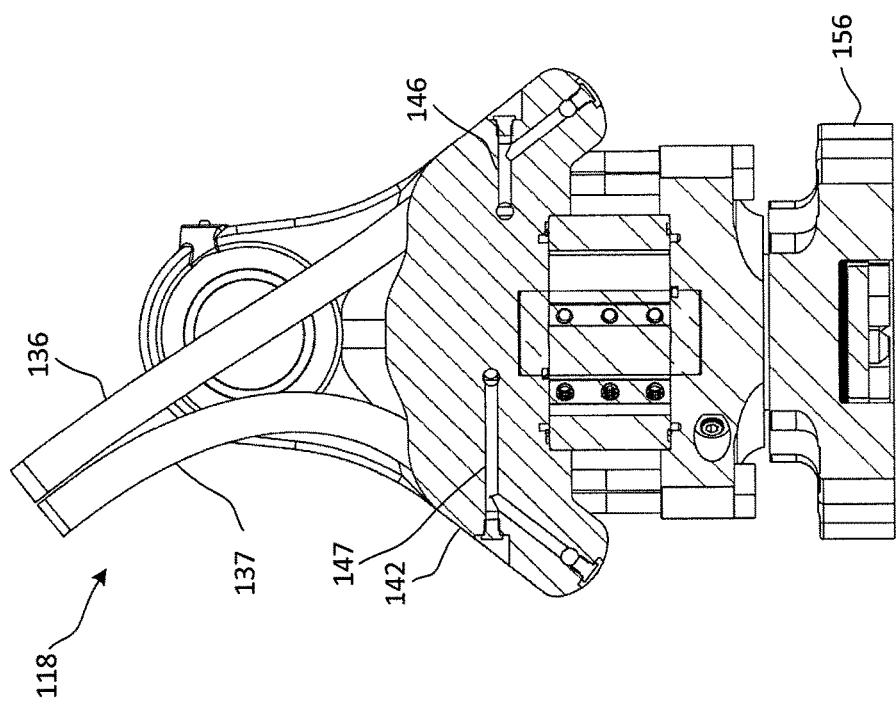
FIG. 9 is a section view of the rotator of FIGS. 3A and 3B along section 9-9 of FIG. 4C.
Figure 12:
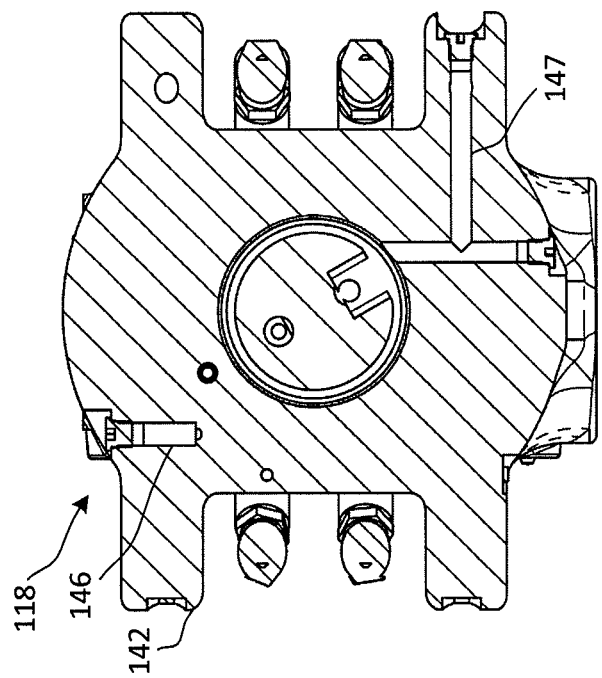
FIG. 12 is a section view of the rotator of FIGS. 3A and 3B along section 12-12 of FIG. 4A.
Figure 11:
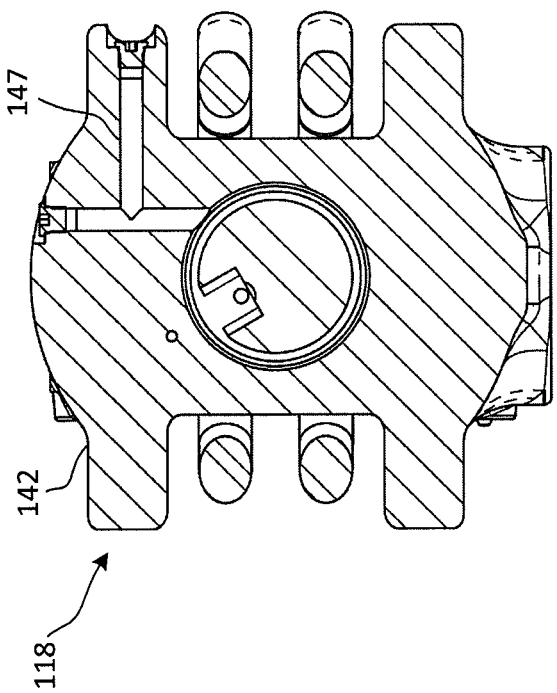
FIG. 11 is a section view of the rotator of FIGS. 3A and 3B along section 11-11 of FIG. 4A.
Figure 14:
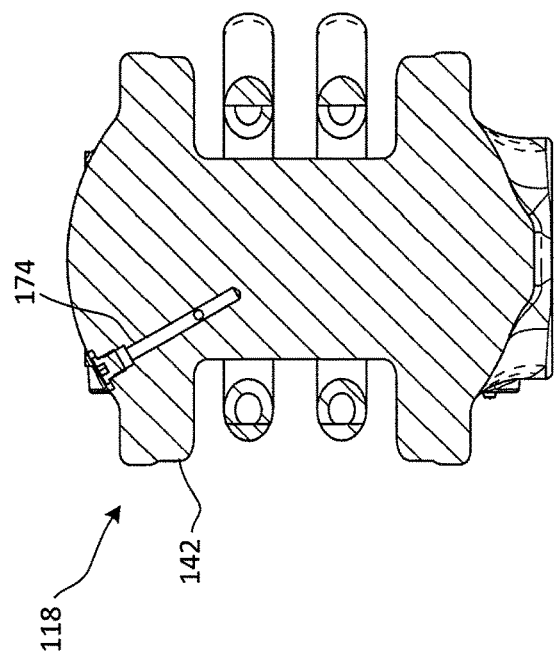
FIG. 14 is a section view of the rotator of FIGS. 3A and 3B along section 14-14 of FIG. 4A.
Figure 13:
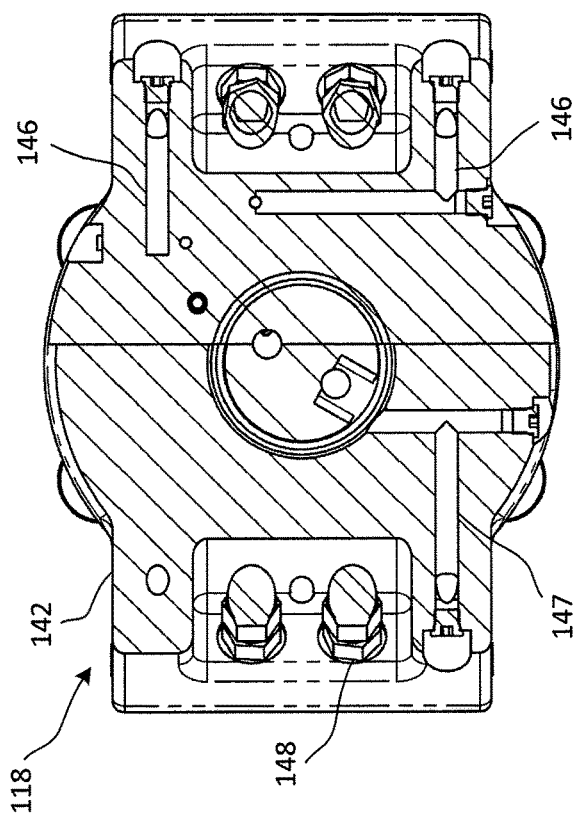
FIG. 13 is a section view of the rotator of FIGS. 3A and 3B along section 13-13 of FIG. 4E.

FIGS. 3A and 3B illustrate the rotator 118, in accordance with an embodiment. FIGS. 4A, 4B, 4C, 4D, and 4E illustrate front, bottom, top, side, and rear views of the rotator 118. FIGS. 5-14 illustrate sectional views of the rotator 118.

The rotator 118 rotates the implement 114 around a rotation axis 144. The rotation axis 144 is vertical in an at rest configuration and perpendicular to one or both of the first axis 122 and the second axis 126. The rotation axis 144 is perpendicular to the pins 128, 130 between the link 116 and rotator 118. The pins 128, 130 engage with bearings 129a, 129b of the rotator 118.

The rotator 118 includes a rotary manifold 142 housing a hydraulic motor 140 (rotational drive) and a rotate shaft 150. The hydraulic motor 140 is integral to the rotator 118 and powers rotation of the rotate shaft 150 about the rotation axis 144. The rotate shaft 150 is affixed to the implement 114 by a taper lock bushing 152, retaining bolts 154, and an implement attachment 156, such that the implement 114 will rotate with respect to the rotary manifold 142 about the rotation axis 144.

As shown in FIGS. 2A-2G, hydraulic fluid is supplied from a hydraulic pump or controller (not shown) at the crane 112 to two hydraulic drives at the rotator 118 via hydraulic conduits 136, 137. In this case, the hydraulic drives include the hydraulic motor 140 and the implement 114 but there may be embodiments where there may be one hydraulic drive or a plurality of hydraulic drives. The hydraulic conduits 136, 137 are generally flexible hoses, as is known in the art. For ease of reference, both the hydraulic pump/controller and the hydraulic drives will be referred to as hydraulic elements. The hydraulic controller includes a pump, valves, and user controls as is known in the art.

A first pair of the hydraulic conduits 136 powers and controls the hydraulic motor 140. The hydraulic fluid supplied by the hydraulic conduits 136 passes into and out of passages 146 in the rotary manifold 142 and into pressure and return portions of the hydraulic motor 140. A check valve and check valve conduit 174 can be provided in the rotary manifold 142 to compensate for any hydraulic fluid leaks. The rotate shaft 150 includes vanes 158 which are driven by the hydraulic motor 140 to rotate the rotate shaft 150 about the rotation axis 144.

A second pair of the hydraulic conduits 137 provides hydraulic fluid to actuate hydraulic cylinder 139 of the implement 114. The second set of hydraulic conduits 137 pass hydraulic fluid through passages 147 in the rotary manifold 142 to the rotate shaft 150. The hydraulic fluid then passes through passages 149 in the rotate shaft 150 to openings 162 on an external surface 164 at the opposite end of the rotate shaft 150. The hydraulic fluid then passes through to the hydraulic cylinder 139 of the implement 114. The hydraulic fluid in the passages 147 can be sealed with seals 160.

Figure 2F:
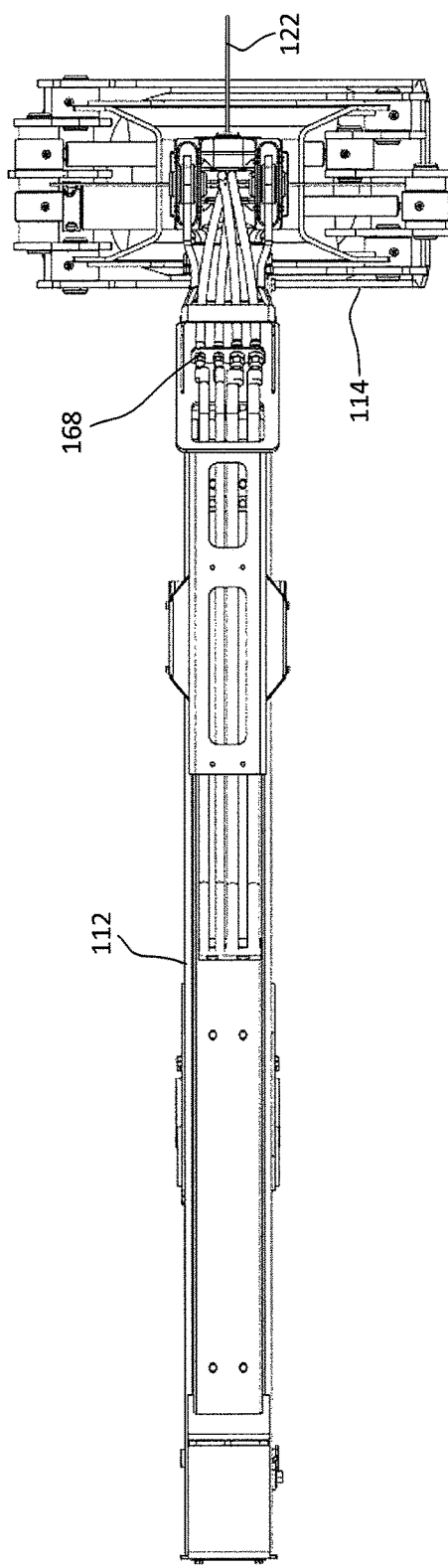
Figure 2G:
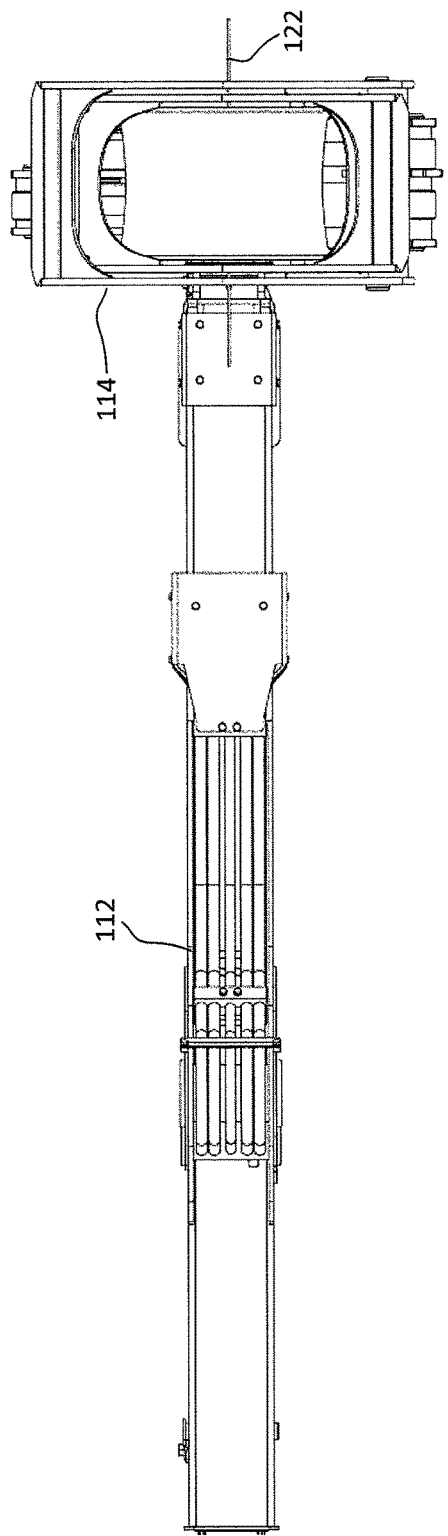

As shown in FIGS. 3A and 3B, the first pair of hydraulic conduits 136 includes a first motor conduit 136a for supplying hydraulic fluid to rotate the hydraulic motor 140 clockwise (as viewed from the top of the rotator 142, e.g. FIG. 2F). The first pair of hydraulic conduits 136 also includes a second motor conduit 136b for supplying hydraulic fluid to rotate the hydraulic motor 140 counter-clockwise (as viewed from the top of the rotator 142, e.g. FIG. 2F). The second pair of hydraulic conduits 137 includes a first grapple conduit 137a for supplying hydraulic fluid to close the implement 118. The second pair of hydraulic conduits 137 also includes a second grapple conduit 137b for supplying hydraulic fluid to open the implement 118.

The rotate shaft 150 is supported by bearings 166 that transfer vertical loads from the implement 114 to the link 116 then to the crane 112 through the pins 128, 130, 132, 134. Horizontal loads are taken by contact between the rotate shaft 150 and the rotary manifold 142 at positions above and below the hydraulic motor 140.

The rotator 118 includes connectors 148 for connecting the hydraulic conduits 136, 137 to the rotary manifold 142. Each of the connectors 148 has a connection axis 170 defined by the direction the hydraulic conduits 136, 137 connect to connectors 148.

Figure 15:
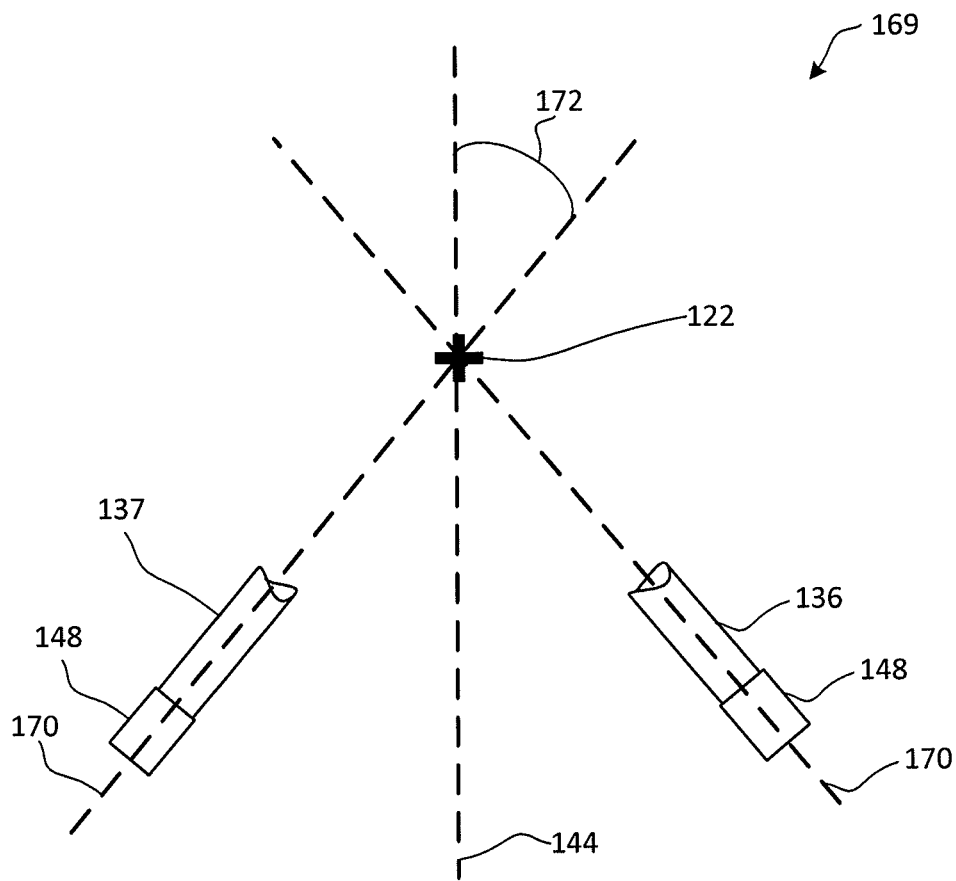
FIG. 15 is a schematic diagram of the connection axes of the rotator of FIGS. 3A and 3B.
Figure 16:
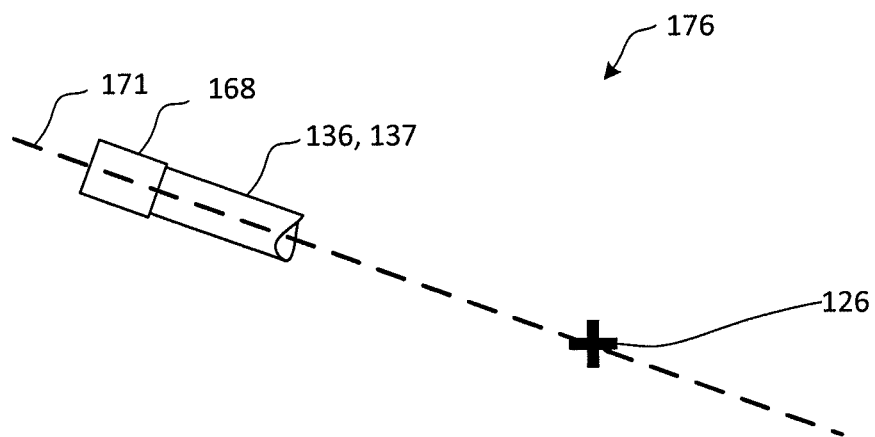
FIG. 16 is a schematic diagram of the crane connection axis of the crane of FIGS. 2A to 2G.

FIG. 15 is a schematic drawing illustrating a hydraulic assembly 169, according to an embodiment herein. In particular, the hydraulic assembly 169 includes the first pivot connection 120 defining the first axis 122 and the connector 148 defining the connection axis 170 where the connectors 148 are configured such that the connection axis 170 approximately intersects the first axis 122. As shown in FIG. 16 with reference to FIGS. 2A to 2G, a generally similar hydraulic assembly 176 can be provided at the crane 112, where crane connectors 168 are provided to the crane 118 to connect the hydraulic conduits 136, 137 to the hydraulic controller (not shown). The placement of the crane connectors 168 defines a crane connection axis 171 which is directed to approximately intersect the second axis 126 of the second pivot connection 124 of the rotator link assembly 100.

This configuration of the connectors 148, 168 on the rotator 118 and on the crane 112 such that the respective axes intersect related pivot axes is intended to reduce damage to the hydraulic conduits 136, 137 during operation. Further, the configuration is intended to permit the hydraulic conduits 136, 137 to flex naturally within hose design limits while minimizing the size of the rotator link assembly 100 with a compact design.

In embodiments herein, "approximately intersecting" is intended to include a range of values based on various factors, for example, the diameter of the hydraulic conduit 136, 137, the allowable bend radius of the hydraulic conduit 136, 137, the distance between the connectors 148, 168 on either side of the first and second axes 122, 126, and the length of the hydraulic conduits 136, 137. For example, "approximately intersecting" may include a situation where the connection axis 170, 171 is within a radius of the hydraulic conduit 136, 137 of intersecting the axis 122, 126. In one particular prototype, connectors 148 connected with hydraulic conduits 136, 137 having an outside diameter of 23.4 mm and the connection axis 170 passed within 18.5 mm of the first axis 122 (measured perpendicular to the first axis 122), the hydraulic conduits 136, 137 moved through a desired range of motion and appeared to function acceptably during testing.

The configuration of the embodiments herein is beneficial because, when the connection axes 170, 171 passes further away from the first and second pivot axis 122, 126, buckling of the hydraulic conduits 136, 137 may occur. Further, where the connection axes 170, 171 do not approximately intersect the first and second axes 122, 126, the hydraulic conduits 136, 137 may undesirably bend in the wrong direction during pivoting.

The configuration of the embodiments herein is also beneficial because it allows for a compact design. For example, if the hydraulic conduits 136 or 137 are put into a linear position where the connectors 148 are rotated to face the connectors 168 and the respective connection axes pass through the first axis 122 and the second axis 126, this linear position determines the minimum length of the hydraulic conduit 136, 137. That is, to allow the connectors 148, 168 to be at the minimum distance possible for the most compact design, the connectors 148, 168 face directly at the first and second axes 122, 126. Although this configuration might provide the minimum distance, in practical applications, the hydraulic conduits 136, 137 may have some additional length, for example, at least one or two additional radius of length.

When the connectors 148, 168 are positioned at a distance from the first and second axes 122, 126 less than the minimum allowed bend radius of the hydraulic conduits 136, 137 on either side of the first and second axes 122, 126, the hydraulic conduits 136, 137 may buckle. If the connectors 148, 168 are farther from the first and second axes 122, 126, the hydraulic conduits 136, 137 may permissibly buckle within the bend radius of the hydraulic conduit 136, 137.

In the embodiment of the rotator link assembly 100, a distance between the first axis 122 and the top of the rotator 118 may be reduced by also positioning the connectors 148 for the hydraulic conduits 136, 137 on the rotator 118 such that the connection axis 170 is not parallel with the rotation axis 144 of the hydraulic motor 140. For example, the connection axis 170 may be at an angle 172 of 5 to 85 degrees with respect to the rotation axis 144. In other cases the angle may be between 20 and 70 degrees or between 30 and 60 degrees. In a particular case, the connection axis 170 may be at an angle 172 of approximately 30 degrees with respect to the rotation axis 144. Generally speaking, the first axis 122 is positioned as close to the hydraulic connectors 148 as possible based on the flexibility and the design constraints of the hydraulic conduits 136, 137.

As shown in, for example, FIG. 2B, the connectors 148, 168 are also positioned to generally route the hydraulic conduits 136, 137 between the pins 128, 130 of the first axis 122 and the pins 132, 134 of the second axis 126.

In conventional systems, hydraulic conduits typically run exposed outside of a link between the end of the crane and the implement. In contrast, the hydraulic conduits 136, 137 pass through the pins 128, 130 of the first axis 122 and the pins 132, 134 of the second axis 126 in a manner that reduces damage to the hydraulic conduits 136, 137 when the pivot pins 128, 130, 132, 134 articulate. The routing path of the hydraulic conduits 136, 137 between each pair of pins 128, 130 and 132, 134 at each axis 122, 126 is intended to protect the hydraulic conduits 136 from damage from external materials such as trees or the like to the rotator link assembly 100.

The connectors 148 are not overly exposed, reducing the chance of accidental impact and damage and providing a compact design and access for repairs. The configuration of the connectors 148 to the rotator 118 may also reduce the need to provide a protective cover to the hydraulic conduits 136, 137.

While the axes 122, 126, 144, are described as being, horizontal, horizontal, and vertical when at rest, it will be understood that these axes 122, 126, 144 need not be horizontal and vertical and the orientation may depend on the required orientation of the hydraulic assembly, and, in this embodiment, of the crane 112 and the rotator link assembly 100.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. The above-described embodiments are intended to be examples only. Alterations, modifications and variations can be effected to the particular embodiments by those of skill in the art without departing from the scope, which is defined solely by the claims appended hereto.

What is claimed is:

1. A hydraulic assembly comprising:
   a pivot connection defining a pivot axis within a rotator link assembly of the hydraulic assembly;
   a hydraulic drive linked to the pivot connection and defining a hydraulic drive axis;
   a plurality of hydraulic conduits for providing hydraulic fluid to the hydraulic drive, each of the plurality of hydraulic conduits passing through the pivot connection; and
   a plurality of connectors provided to the hydraulic drive for connecting the plurality of hydraulic conduits to the hydraulic drive, wherein each of the plurality of connectors defines a connection axis along the direction of the connected hydraulic conduit;
   wherein each of the plurality of connectors is configured such that each connection axis is directed at and approximately intersects the pivot axis and is not parallel with the hydraulic drive axis.

2. The hydraulic assembly of claim 1, wherein the pivot connection comprises:
   a pair of pins attaching the hydraulic element to a link; and
   wherein the hydraulic conduit passes between the pair of pins.

3. The hydraulic assembly of claim 1, wherein an angle between the connection axis and the hydraulic drive axis is greater than approximately 5 degrees and less than approximately 85 degrees.

4. The hydraulic assembly of claim 3, wherein the hydraulic drive comprises a rotational drive and the hydraulic drive axis is the axis of rotation of the rotational drive.

5. The hydraulic assembly of claim 3, wherein the angle is approximately 30 degrees.

6. Equipment comprising:
   a link;
   a first pivot connection defining a first pivot axis within a rotator link assembly of the equipment;
   a rotator defining a rotation axis, the rotator pivotally attached to the link via the first pivot connection; and
   a hydraulic assembly provided to the rotator, the hydraulic assembly comprising:
      a hydraulic element; and
      a plurality of connectors, each connector defining a connection axis;
   a plurality of hydraulic conduits extending from the link through the first pivot connection and to the plurality of connectors for connecting to the hydraulic element, wherein the direction of the hydraulic conduit at the connector defines the connection axis;
   wherein each connector is configured such that each connection axis is directed at and approximately intersects the first pivot axis and is not parallel with the rotation axis.

7. The equipment of claim 6, wherein an angle between the connection axis and the rotation axis is greater than approximately 5 degrees and less than approximately 85 degrees.

8. The equipment of claim 7, wherein the angle is approximately 30 degrees.

9. The equipment of claim 7, wherein the first pivot axis is perpendicular to the rotation axis.

10. The equipment of claim 6 wherein the first pivot connection comprises a first pair of pins attaching the rotator to the link and the hydraulic conduit passes between the first pair of pins.

11. The equipment of claim 6, further comprising a crane pivotally attached to the link at a second pivot connection defining a second pivot axis.

12. The equipment of claim 11 wherein the equipment further comprises a crane connector provided to the crane for connecting the hydraulic conduit to the crane,
   wherein the crane connector defines a crane connection axis and the crane connector is configured such that the crane connection axis approximately intersects the second pivot axis.

13. The equipment of claim 12, wherein the second pivot axis is perpendicular to the first pivot axis.

14. The equipment of claim 11, wherein the second pivot connection comprises a second pair of pins attaching the link to the crane and the hydraulic conduit passes between the second pair of pins.

15. The equipment of claim 6, wherein the hydraulic element is an implement and the hydraulic conduit supplies hydraulic fluid to the implement.

16. The equipment of claim 15, wherein the implement is a grappler.

17. The equipment of claim 6, wherein the hydraulic element comprises a plurality of hydraulic elements and the hydraulic conduit comprises a plurality of hydraulic conduits supplying hydraulic fluid to the plurality of hydraulic elements.

18. The equipment of claim 17, wherein the plurality of hydraulic elements comprises a hydraulic motor and a grappler.

19. Equipment comprising:
   a link;
   a pivot connection defining a pivot axis within a rotator link assembly of the equipment;
   a rotator pivotally attached to the link via the pivot connection, the rotator defining a rotation axis; and
   a hydraulic assembly provided to the rotator;

a plurality of hydraulic conduits provided extending from the link to the hydraulic assembly, each of the plurality of hydraulic conduits passing proximate to the pivot connection; and a plurality of connectors provided external to the rotator for connecting the plurality of hydraulic conduits to the hydraulic assembly, wherein each of the plurality of connectors defines a connection axis along the direction of the hydraulic conduit at the connection point, wherein each of the plurality of connectors is configured such that each connection axis is directed at and approximately intersects the pivot axis and is not parallel with the hydraulic drive axis.

\* \* \* \* \*